Aug. 25, 1953

G. C. PAXTON 2,649,582

MECHANISM FOR AUTOMATICALLY FEEDING
BOX ENDS IN NAILING MACHINES

Filed Feb. 19, 1951

INVENTOR
Gerald C. Paxton

BY
ATTORNEYS

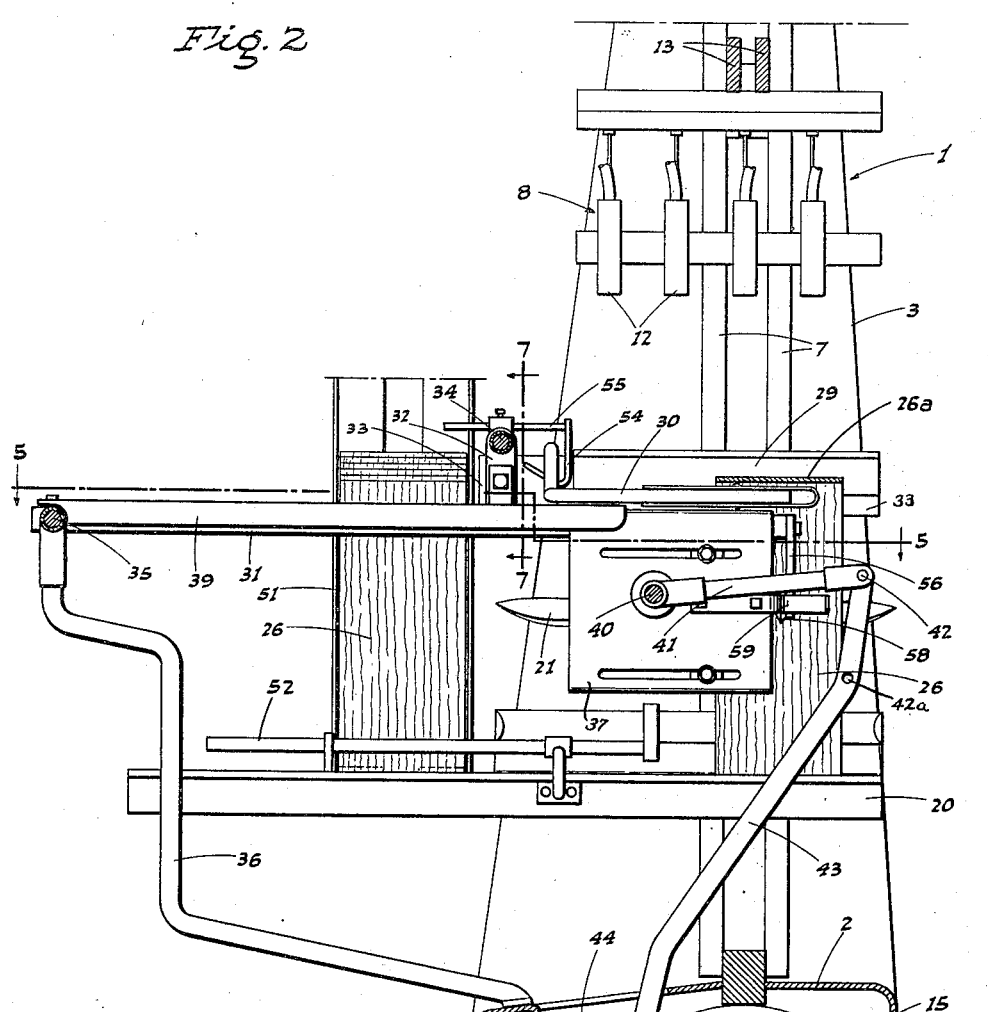
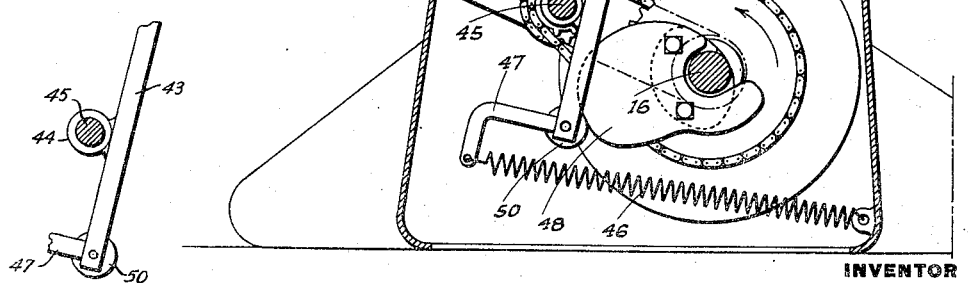

Aug. 25, 1953

G. C. PAXTON 2,649,582

MECHANISM FOR AUTOMATICALLY FEEDING
BOX ENDS IN NAILING MACHINES

Filed Feb. 19, 1951

INVENTOR
Gerald C. Paxton

BY *Webster & Webster*
ATTORNEYS

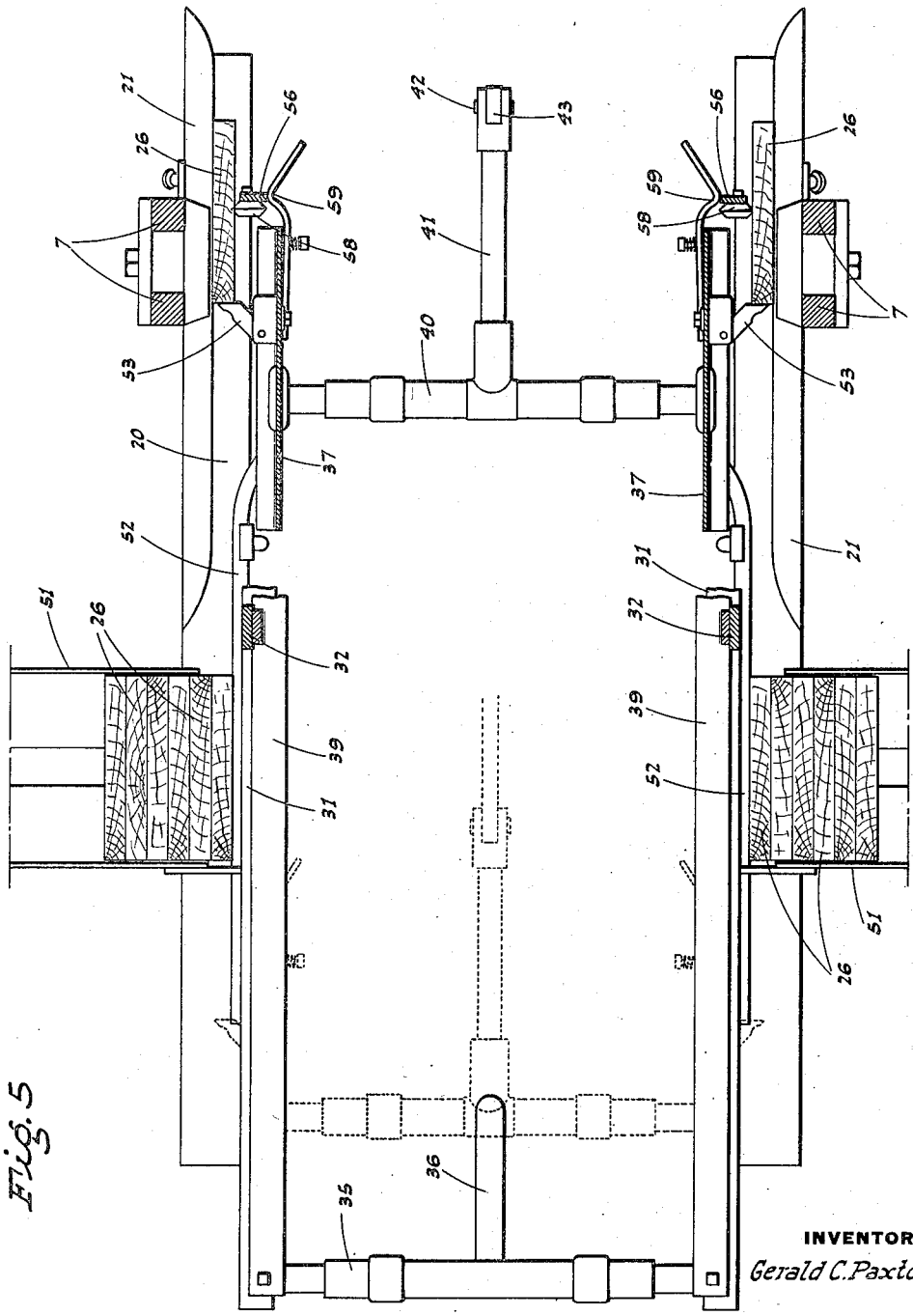

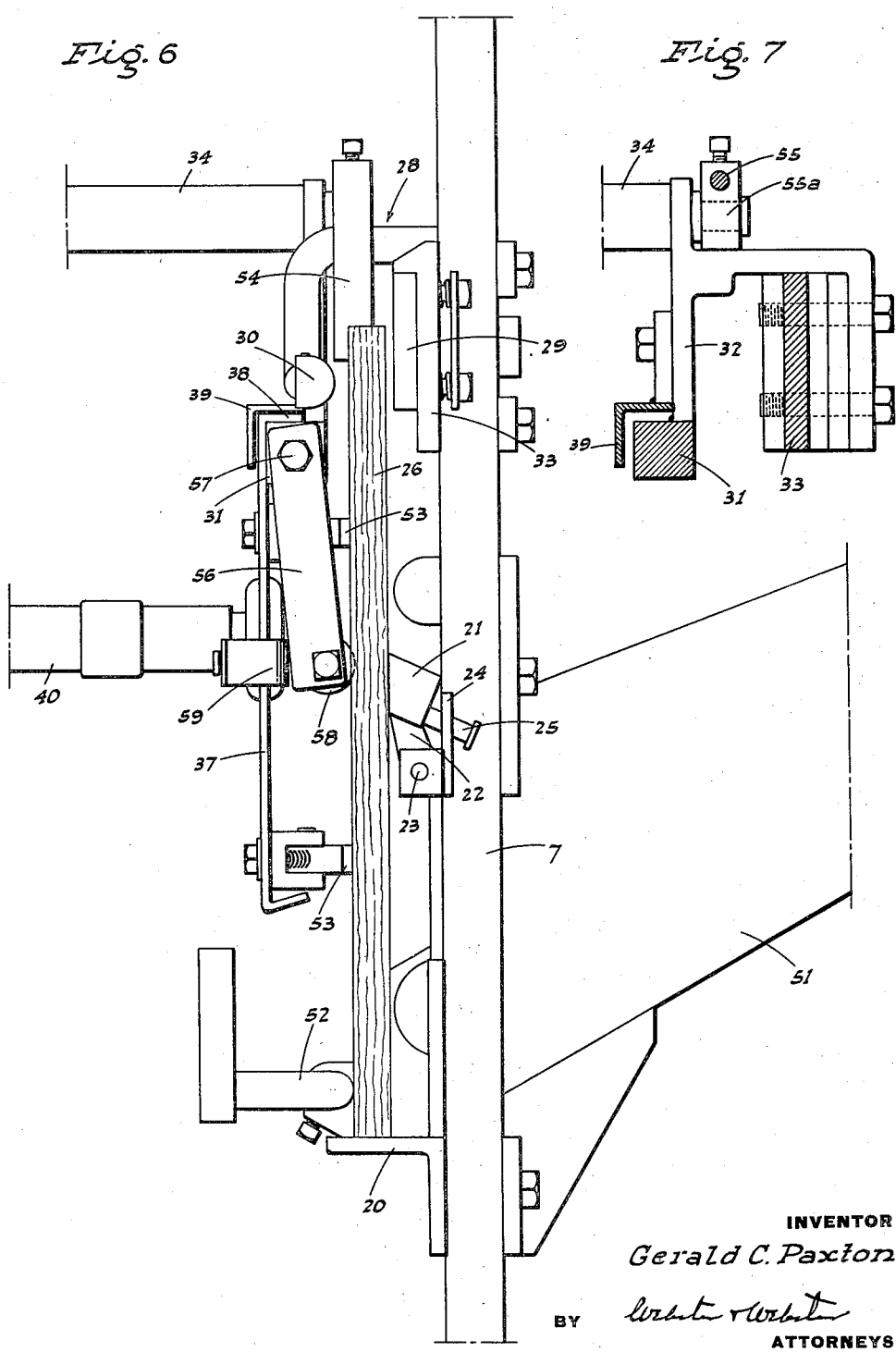

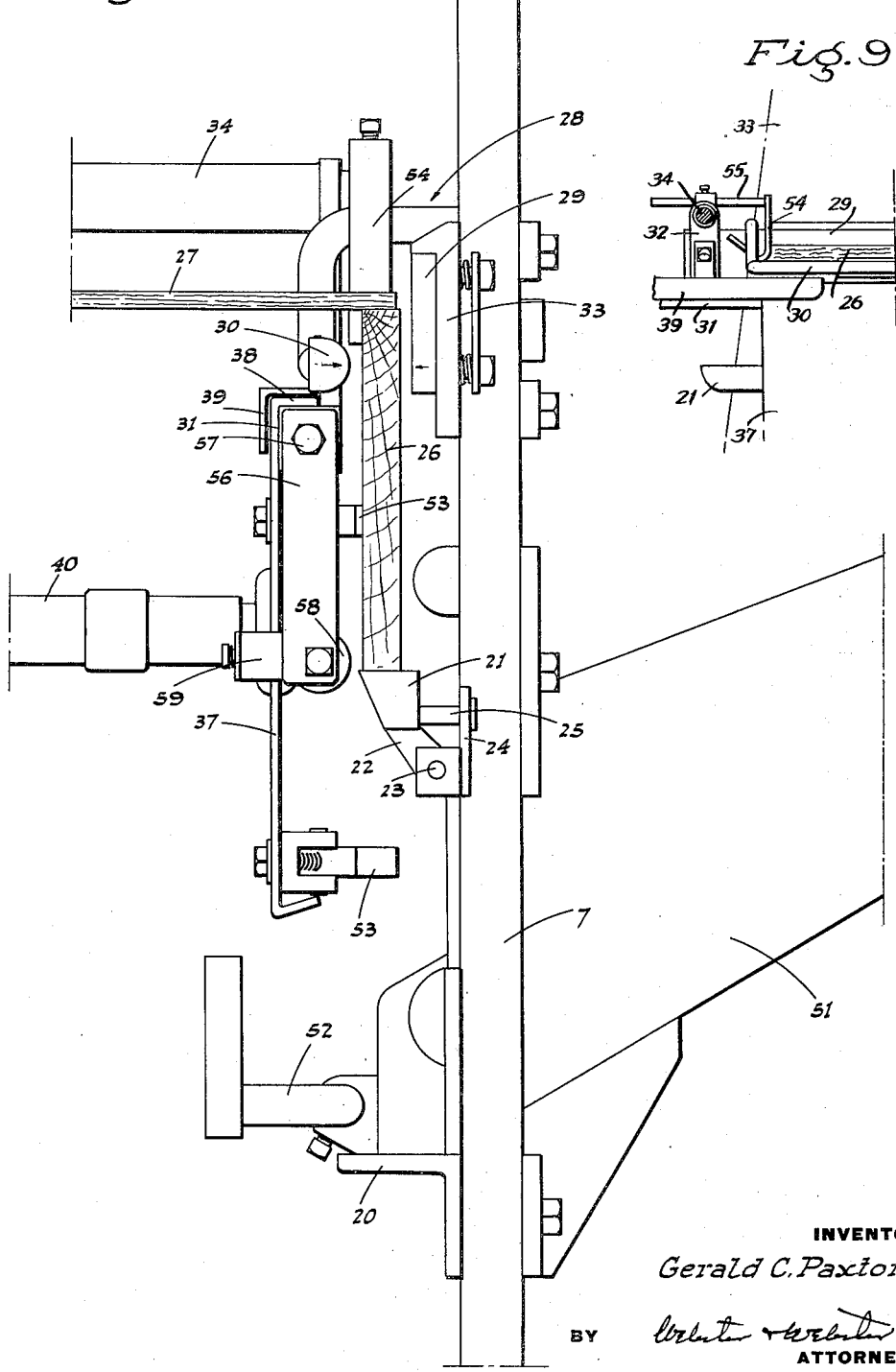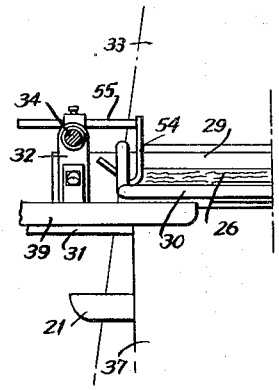

Patented Aug. 25, 1953

2,649,582

UNITED STATES PATENT OFFICE 2,649,582

MECHANISM FOR AUTOMATICALLY FEEDING BOX ENDS IN NAILING MACHINES

Gerald C. Paxton, Sanger, Calif., assignor to General Nailing Machine Corporation, Sanger, Calif., a corporation of California Application February 19, 1951, Serial No. 211,698

14 Claims. (Cl. 1—14)

The present invention is directed to improvements in box making or nailing machines.

In making a box, in many machines of this type, it is requisite for the operator to first manually position a pair of initially separate box ends in transversely spaced facing relation in the box framing assembly of the machine, whereupon one side, the bottom, and finally the other side, are manually applied; the machine automatically nailing such latter parts to the box ends with successive downward nailing strokes of the included nailing units, and preliminary to each such stroke the operator quarter-rotates the box in the framing assembly.

In order to facilitate box making it is a major object of this invention to provide a novel mechanism for automatically feeding the box ends into the framing assembly of the machine; thus eliminating the necessity of manual placement of such box ends by the operator, and consequently accelerating the box making operation.

Another important object of this invention is to provide box end feeding mechanism, as in the preceding paragraph, which is automatically actuated in timed relation to the nailing cycles of the nailing units in the machine; the timing being such that when the final nailing cycle occurs in the making of a box, the mechanism functions to feed the next pair of box ends into proper position in the framing assembly.

An additional object of the invention is to provide box end feeding mechanism, as above, which is operative to feed the box ends forwardly into the box framing assembly from chutes at the rear end of the machine; the proper timing of the feeding mechanism being attained through the medium of a novel cam and swing arm assembly actuated from the driving mechanism for the nailing units.

A further object of the invention is to embody, in the box end feeding mechanism, a novel device automatically operative to prevent forward coasting of the box ends on the lower anvils beyond their intended point of maximum advance, and at which point the box ends must stop in order that the first nailing stroke may be properly accomplished.

A still further object of this invention is to provide a box end feeding mechanism, for nailing machines, which functions smoothly, yet positively, to advance the box ends from the aforesaid chutes forwardly into the box framing assembly of the machine; the mechanism being designed for long service, with a minimum of maintenance or repair being required.

It is also an object of the invention to provide a box end feeding mechanism which may be readily adapted to box nailing machines, of the type described, without any substantial alteration in the general design of the latter.

Still another object of the invention is to provide a practical and reliable box end feeding mechanism for nailing machines, and one which will be exceedingly effective for the purpose for which it is designed.

These objects are accomplished by means of such structure and relative arrangement of parts as will fully appear by a perusal of the following specification and claims.

In the drawings:

Fig. 2 is a central sectional elevation through the machine showing the pusher assembly in its foremost position and just prior to the initial down-stroke of the nailing units.

Fig. 5 is a sectional plan on line 5—5 of Fig. 2;

Fig. 6 is an enlarged fragmentary front elevation showing one side of the box framing assembly, with a box end in its initial position, as in Fig. 2, resting on the corresponding lower anvil.

Fig. 7 is a fragmentary cross section on line 7—7 of Fig. 2.

Fig. 8 is a view similar to Fig. 6, but shows the box in the framing assembly in position for nailing of the bottom thereon; the disclosed box end being shown resting on the corresponding upper anvil, or in position for the second nailing operation.

Fig. 9 is a fragmentary sectional elevation showing a box end supported on the upper anvils and engaged with the movement limiting stop, in the position shown in Fig. 8.

Fig. 10 is a fragmentary side elevation of the lower portion of the oscillatory swing arm, showing the mounting of said arm on its supporting shaft.

Figure 1:
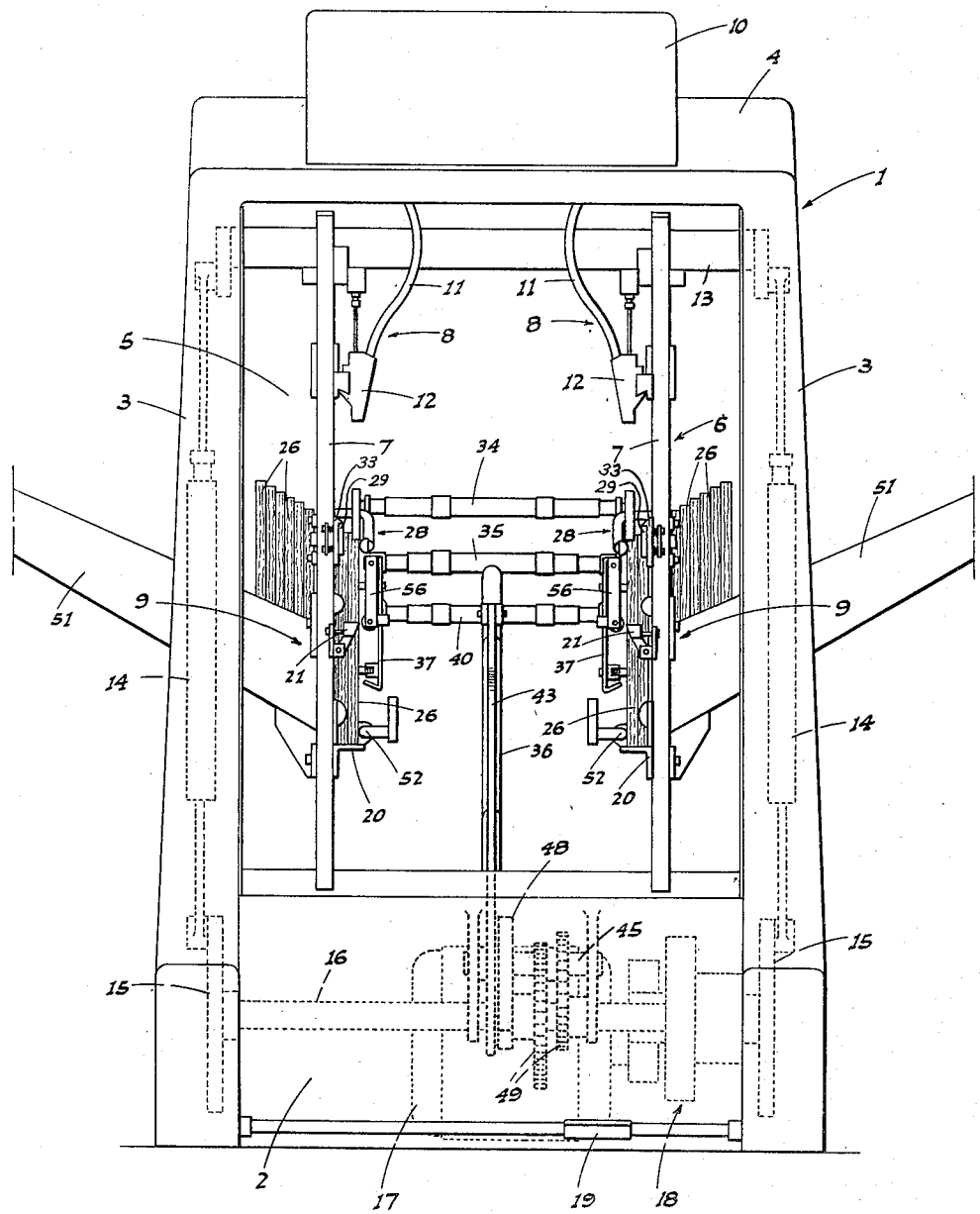
Fig. 1 is a front outline of the machine as embodying the present invention.

Referring now more particularly to the characters of reference on the drawings, the box end feeding mechanism is embodied in a nailing machine which includes an upstanding main frame, indicated generally at 1, having a transversely extending, hollow base housing 2; hollow legs 3 which upstand from opposite ends of the base housing 2; and a top beam 4 which connects said legs at their upper ends.

Such main frame 1 is primarily of sheet metal construction, and the frame defines a relatively large, substantially rectangular opening 5, open front to rear of the machine, and in which opening the box making parts of the machine are mounted.

A mounting frame, indicated generally at 6, for such parts is secured in the main frame 1 mainly within the opening 5, and includes a transversely spaced pair of upstanding mounting posts 7 which are vertically slotted.

The mounting frame 6 carries, in connection with the mounting posts 7, a pair of transversely spaced nailing units 8, and a box framing assembly, indicated generally at 9, is disposed below said nailing units 8 for cooperation therewith.

A nail stripping unit, indicated at 10, is mounted on the top beam 4, and in conventional manner feeds nails through tubes 11 to the chucks 12 of the nailing units 8; said units each including a row of such chucks extending horizontally through the machine.

The nail chucks 12 are driven, in conventional manner, from a top driving bar 13 vertically reciprocably mounted in the main frame 1; said top driving bar being actuated, one cycle at a time—i. e. a down-stroke followed by an up-stroke—by connecting rods 14 secured to opposite ends of the driving bar 13, and thence extending downwardly in the hollow legs 3. At their lower ends the connecting rods 14 are attached to cranks 15 on opposite ends of a main drive shaft 16 journaled in the base housing 2.

An electric motor 17 in the base housing 2 is adapted to be connected—in driving relation to the shaft 16—by means of a clutch and brake unit 18; there being a foot pedal 19 at the front of the machine arranged so that with each depression of said pedal the clutch and brake unit 18 functions in a manner so that the electric motor 17 imparts one revolution only to the cranks 15. When this occurs the connecting rods 14 are actuated through one cycle, first thrusting the top driving bar 13 downwardly and then returning it on an up-stroke to its raised starting position.

The box framing assembly, indicated generally at 9, comprises lower, box end supporting anvils 20 and upper, box end supporting anvils 21 secured to the mounting posts 7 on the adjacent sides thereof; the corresponding anvils 20 and 21 being in vertically spaced relation and extending through the machine horizontally from front to rear.

The lower anvils 20 are rearwardly elongated a substantial extent, for the purpose which will hereinafter appear, while the upper anvils 21 are each swingable from a laterally inwardly disposed working position, as in Fig. 8, outwardly; i. e., toward the corresponding mounting post 7 to a retracted or out-of-the-way, non-working position, as in Fig. 6.

Each anvil 21 includes dependent attachment fingers 22 spaced lengthwise of the anvil, and pivoted, as at 23, to an attachment plate 24 secured to the corresponding post 7; there being one or more headed limit pins 25 which extend from each upper anvil 21 through the related plate 24 whereby to limit lateral inwardly swinging motion of said anvil to its proper working position, but without restricting its swinging in the other direction to retracted out-of-the-way position.

The framing assembly of the machine includes the lower anvils 20 and upper anvils 21 in vertically spaced relation, for the reason that the box ends 26 are normally of greater length than height.

Consequently, when the box ends 26 stand on end for nailing, as in Fig. 6, the lower anvils 20 are used, but when such box ends stand on their lengthwise edges for nailing, the upper anvils 21 are used, as in Fig. 8. It will be understood that in the making of a box in the framing assembly 9, a pair of the box ends 26 first rest endwise on the lower anvils 20 for the nailing of one side 26a to the box; the upper anvils 21 then being swung to their non-working position by engagement of the adjacent box end therewith.

In the next step of the box framing operation the box is quarter-turned by the operator, and the box ends rest with their longitudinal edges on the upper anvils 21 for the nailing of the bottom 27 to said ends.

In the third and final operational step the partially completed box is again quarter-turned in the framing assembly, causing the upper anvils 21 to swing to non-working position, with the box ends 26 again resting endwise on the lower anvils 20 for nailing of the other box side 26b.

This is a generally conventional operation, and the box ends in each of the three nailing positions are effectively clamped in the box framing assembly 9, with each down-stroke of the nailing units, by means of box end clamping units, each indicated generally at 28. These clamping units are mounted in connection with the corresponding posts 7, and each such unit includes a clamping plate 29 and a clamping arm 30 between which the upper portion of the box end is initially disposed in clearance relation. As the nailing chuck units drive downwardly, the clamping plate 29 and clamping arm 30 of each unit 28 move toward each other and clamp the box end therebetween. The clamping units 28 are constructed in detail, and are caused to function, in the manner shown particularly in United States Patent No. 2,488,757, dated November 22, 1949.

In many nailing machines it is requisite that the operator manually place the pair of box ends 26 on the lower anvils 20 preparatory to the initial nailing step; this slowing down the operation of the machine and reducing its output.

The present invention provides a novel mechanism for automatically feeding a pair of the box ends 26 into the box framing assembly 9 from the rear of the machine, and at the outset of each box making operation; said mechanism comprising the following:

A pair of horizontal rails 31 are disposed above but slightly laterally inwardly relative to the upper anvils 21; such rails being supported by inverted U-shaped suspension brackets 32 which straddle and are secured to horizontal attachment plates 33 connected to the corresponding mounting posts 7. The attachment plates 33 also serve as the mount for the laterally inwardly movable clamping plate 29 of the corresponding box end clamping unit 28.

The brackets 32 are connected at the upper ends thereof by a cross shaft 34, while the rails 31 are connected at their rear ends by a cross shaft 35; there being a central supporting rod 36 which extends upwardly and rearwardly from the hollow base housing 2 to connection with the cross shaft 35.

Laterally facing pusher plates 37 (Fig. 8) depend from the horizontal rails 31 (Fig. 7), and such plates are formed at the upper edge with laterally outturned suspension flanges 38 which ride the tops of said rails 31, being held from escape therefrom by hold-down angle irons 39.

The pusher plates 37 (Fig. 5) are connected by a cross shaft 40 having a central connecting rod 41 (Fig. 2) projecting forwardly therefrom; such connecting rod being pivotally connected at its forward end, as at 42, to the upper end of an upstanding oscillatory swing arm 43. The swing arm 43 is disposed in a plane centrally between the pusher plates 37, and is adapted to oscillate lengthwise of the machine; such swing arm being journaled adjacent but short of its lower end, as at 44, to a countershaft 45 (Fig. 10) in the base housing 2 rearwardly of the main drive shaft 16. The swing arm 43 is urged rearwardly; i. e. to its retracted starting position, by means of a tension spring 46 connected to an extension finger 47 on the lower end of the swing arm 43.

The swing arm 43 is adapted to be swung forward and rearward to impart a forward stroke to the pusher plates 37 followed by a rearward stroke thereof with each revolution of the main drive shaft 16, as follows:

A rotary cam 48 is turnably journaled on the main drive shaft 16, and is driven at reduced speed—i. e., one revolution for each three revolutions of the shaft 16—by means of a speed-reducing assembly which comprises endless chain and sprocket units 49 which connect the shaft 16 to the countershaft 45, and connect the latter to the rotary cam 48. The configuration of the cam 48 is such as to impart a predetermined order of movement to the swing arm 43, and consequently to the pusher plates 37, with each three revolutions of the main drive shaft 16, which three revolutions impart a corresponding number of nailing cycles to the nailing units 8.

The swing arm 43 is fitted, at its lower end, with a roller 50 which rides the cam 48. In order that the length of the stroke of plates 37 may be shortened when necessary, the arm 43 is provided with a lower hole 42a to receive the pivot pin of rod 41.

A pair of box end chutes 51 are mounted at the rear of the machine in upwardly and outwardly diverging relation; such chutes being adapted to receive a row of the box ends 26, with the latter in face to face relation, and the chutes being disposed so that they feed the lowermost box ends of the rows onto the corresponding rearwardly elongated portion of the lower anvils 20, with such box ends in endwise upstanding position.

Escape of the anvil supported box ends laterally inwardly from the anvils 20 is prevented by means of a horizontally disposed, longitudinal stop rod 52 mounted in connection with each lower anvil 20; the arrangement being such that as the box ends 26 feed from the chutes 51 onto the anvils 20, such box ends abut the stop rods 52, yet the latter are arranged so that said box ends may feed forwardly on the anvils 20 without obstruction.

From the initial position on the lower anvils 20 the endwise upstanding box ends 26 are engaged from the rear, upon advance of the pusher plates 37, by vertically spaced pusher lugs 53 on said plates; the pusher lugs being horizontally adjustable on the plates 37, and of a "snap-by" type which permit such lugs to fold inwardly and ride rearwardly past the next to be advanced box ends 26, upon occurrence of the retracting stroke of such pusher plates.

The cycling of the pusher plate assembly is as follows relative to the cycling of the nailing units 8:

The cam 48 is generated, and runs in such timed relation to operation of the nailing units 8 through their three nailing cycles, that as said nailing units move down and then up on their first nailing cycle, to nail side 26a to the already fully advanced box ends 26, (Fig. 2), the pusher plates 37 then fully retract so that the pusher lugs 53 are behind the next box ends to be advanced.

The partially assembled box is then quarter-turned by the operator and disposed in the framing assembly to place the ends 26 in position for the second nailing operation, (Fig. 9), to-wit the nailing of the bottom 27 on the box.

Figure 3:
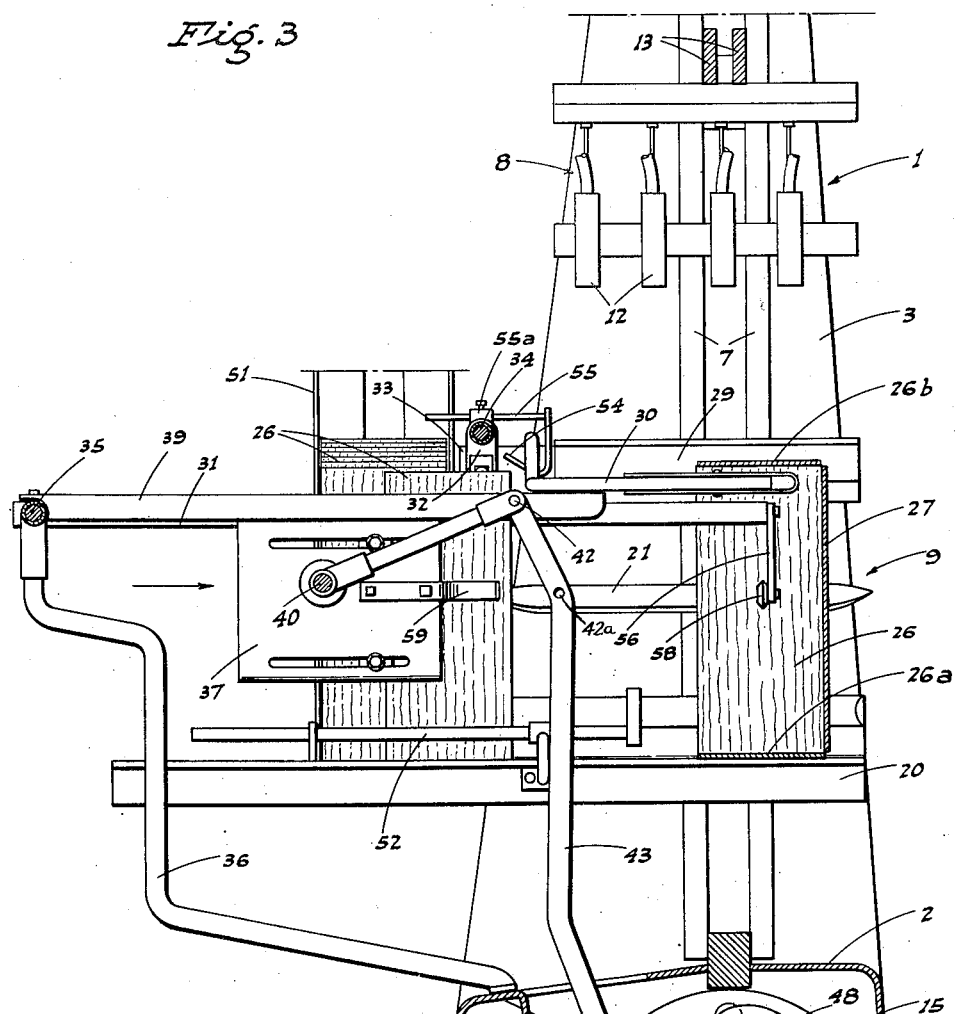
Fig. 3 is a similar view, but shows the pusher assembly after retraction and in part-advanced position just prior to the final down-stroke of the nailing units.
Figure 4:
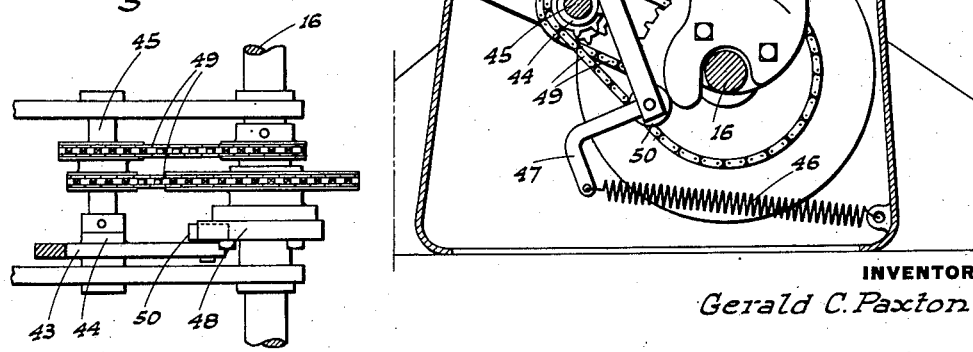
Fig. 4 is a fragmentary plan view of the speed-reducing, cam drive arrangement.

During the down or nailing stroke of the second nailing cycle of nailing units 8, the pusher plate assembly dwells in its fully retracted position, but during the up-stroke of the nailing units 8 in said cycle, the pusher plate assembly advances only sufficiently to push the next pair of box ends from the chutes into tilting engagement with the upper anvils 21 as shown in Fig. 3; said anvils being rounded or feathered at their rear ends for such purpose. The upper anvils 21 are thus automatically swung upward and outward to their out-of-the-way, non-working position after the box bottom 27 is nailed and preparatory to repositioning of the box for nailing of the box sides 26b.

For this final nailing operation the partially assembled box is turned by the operator to the position shown in Fig. 3, resting on the lower anvils 20 ready for the nailing of sides 26b to the box; such manipulation of the box being facilitated by reason of the previous automatic retraction of the upper anvils 21, as above.

During the down or nailing stroke of the third nailing cycle of the nailing units 8, the pusher plate assembly dwells at its partially advanced position, but during the up-stroke of said nailing units in such third cycle, the pusher plate assembly is fully advanced, carrying the next pair of box ends to position for the first nailing operation. At the same time such new pair of box ends engage and push the previously completed box forwardly out of the box framing assembly of the machine.

The pusher plate assembly thus works through a complete cycle, advancing a new pair of box ends with each three cycles of the nailing units 8.

Each pair of box ends 26, as they are advanced from the chutes 51 pass under forwardly swingable fingers 54 carried on rods 55 secured by clamps 55a to the end portions of the cross shaft 54; such fingers being non-swingable rearwardly from normal dependent position and forming locating stops for the rear of the box when it is disposed on the upper anvils 21 for nailing of the bottom 27 as shown in Figs. 8 and 9.

When each pair of box ends 26 reaches the nailing position directly below the nailing units 8, it is desired to stop forward motion of said box ends; i. e. to prevent forward coasting thereof on the lower anvils 20. This is accomplished as follows:

Depending, laterally swingable arms 56 (Figs. 3 and 8) are pivoted, at their upper ends—as at 57—to the forward ends of the rails 31, and at their lower ends said arms 56 each include a sharp-edged roller 58 having a working edge portion thereof projecting laterally outwardly. The arms 56 normally hang free of the path of advancing motion of the box ends 26, but immediately upon said box ends reaching the nailing position (Figs. 5 and 6), forwardly projecting spring cams 59 on the pusher plates 37 engage the arms 56 and swing them laterally, whereupon the sharp-edged rollers 58 bite into the box ends 26, instantaneously stopping them and preventing any forward coasting beyond the predetermined nailing position; the pusher plates then being fully advanced.

As soon as the pusher plate assembly retracts, the arms 56 are released and swing back to normal position, and this occurs a moment before the box end clamping units 28 come into play; the latter being actuated by the nailing units on their down-stroke.

The above described mechanism forms a releasable brake for automatically preventing forward coasting of the box ends and is an important feature of the invention, as it assures against forward misalinement of the box ends in the box framing assembly 9.

The box end feeding mechanism described herein provides a very practical and reliable implement in nailing machines of the type described; the machines being capable of greater output, and the initial insertion of the box ends by the operator into the machines is avoided.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A box end feeding mechanism for a box nailing machine having transversely spaced anvils extending therethrough from the rear, and vertically reciprocable nailing units mounted above said anvils; such mechanism comprising chutes mounted in positions to successively deliver box ends onto a rear portion of the anvils, pusher members, means mounting the pusher members for reciprocation adjacent and lengthwise of the anvils whereby to recurringly engage and advance box ends delivered to the anvils by the chutes, the machine including power means operative to actuate the nailing units through a series of nailing cycles for each box, and means between the power means and the pusher members and including a rotary cam formed and operative to reciprocate the pusher members in unison and in predetermined timed relation to actuation of said nailing units and only once for each such series.

2. A box end feeding mechanism for a box nailing machine having transversely spaced anvils extending therethrough from the rear, and vertically reciprocable nailing units mounted above said anvils; such mechanism comprising chutes mounted in positions to successively deliver box ends onto a rear portion of the anvils, pusher members, means mounting the pusher members for reciprocation adjacent and lengthwise of related anvils whereby to recurringly engage and advance box ends delivered to the anvils by the chutes, the machine including power means operative to actuate the nailing units, said power means embodying a driven shaft, a rotary cam, means driving the rotary cam from the shaft in predetermined timed relation, and cam actuated means operative to reciprocate the pusher members in unison; the cam driving means rotating the cam at a predetermined reduced speed relative to the shaft speed to that the nailing units are actuated through a series of nailing cycles for one revolution of the cam; said one revolution causing a single reciprocating cycle only of the pusher members.

3. A box end feeding mechanism for a box nailing machine having transversely spaced anvils extending therethrough from the rear, and vertically reciprocable nailing units mounted above said anvils; such mechanism comprising chutes mounted in positions to successively deliver box ends onto a rear portion of the anvils, pusher members, means mounting the pusher members for reciprocation adjacent and lengthwise of the anvils whereby to recurringly engage and advance box ends delivered to the anvils by the chutes, means connecting the pusher members for reciprocation as a unit, a swing arm pivotally linked to said unit and extending downward therefrom, means pivoting said arm for swinging forward and backward in the machine, a rotary cam journaled in position engaging the swing arm to work the same, the machine including a driven shaft operative to actuate the nailing units, and driving means between the shaft and said rotary cam.

4. A box end feeding mechanism for a box nailing machine having transversely spaced anvils extending therethrough from the rear, and vertically reciprocable nailing units mounted above said anvils; such mechanism comprising chutes mounted in positions to successively deliver box ends onto a rear portion of the anvils, pusher members, means mounting the pusher members for reciprocation adjacent and lengthwise of the anvils whereby to recurringly engage and advance box ends delivered to the anvils by the chutes, means connecting the pusher members for reciprocation as a unit, a swing arm pivotally linked to said unit and extending downward therefrom, the machine including a driven, transverse shaft below the anvils operative to actuate the nailing units one nailing cycle with each revolution of said shaft, a countershaft journaled in adjacent but spaced, parallel relation to the driven shaft, a rotary cam journaled on the latter, speed reducing drive means between the driven shaft, countershaft, and said rotary cam, the swing arm being pivoted intermediate its ends on the countershaft and engaged by the cam whereby said cam oscillates the swing arm and reciprocates the pusher member unit; the speed reducing drive means rotating the cam at a speed so as to oscillate the swing arm and reciprocate said pusher member unit only once for a predetermined number of nailing cycles of said nailing units.

5. A box end feeding mechanism for a box nailing machine having transversely spaced anvils extending therethrough from the rear, and vertically reciprocable nailing units mounted above said anvils; such mechanism comprising chutes mounted in position to successively deliver box ends edgewise onto a rear portion of the anvils for feeding forward thereon to a predetermined nailing position, transversely spaced rails extending horizontally through the machine above the anvils, a pusher plate slidably suspended from each rail for horizontal reciprocating motion edgewise, pusher means on each plate operative on each forward stroke to engage and advance a box end on the adjacent anvil from the chute to said nailing position, means connecting the pusher plates for reciprocation as a unit, and power actuated means operative to reciprocate said pusher plate unit in predetermined timed relation to actuation of said nailing units; the chutes inclining upwardly and laterally outwardly from the anvils at the rear of the machine; there being a longitudinal stop element extending along each anvil adjacent its laterally inner edge adjacent the chute whereby to prevent box ends from escaping the anvils from said edge.

6. A box end feeding mechanism for a box nailing machine having transversely spaced anvils extending therethrough from the rear, and vertically reciprocable nailing units mounted above said anvils; such mechanism comprising chutes mounted in position to successively deliver box ends edgewise onto a rear portion of the anvils for feeding forward thereon to a predetermined nailing position, transversely spaced rails extending horizontally lengthwise of the machine above the anvils, a pusher plate slidably suspended from each rail for horizontal reciprocating motion edgewise, pusher means on each plate operative on each forward stroke to engage and advance a box end on the adjacent anvil from the chute to said nailing position, means connecting the pusher plates for reciprocation as a unit, and power actuated means operative to reciprocate said pusher plate unit in predetermined timed relation to actuation of said nailing units; each pusher plate including a lateral flange along its upper edge slidably engaged on the top of the corresponding rail, and a fixed, longitudinal angle iron engaged over the upper corner of each plate in hold-down relation thereto.

7. A box end feeding mechanism for a box nailing machine having transversely spaced anvils extending therethrough from the rear, and vertically reciprocable nailing units mounted above said anvils; such mechanism comprising chutes mounted in position to successively deliver box ends edgewise onto a rear portion of the anvils for feeding forward thereon to a predetermined nailing position transversely spaced rails extending horizontally and lengthwise of the machine above the anvils, a pusher plate slidably suspended from each rail for horizontal reciprocating motion edgewise, the plates depending for reciprocation adjacent but laterally inwardly of the path of advancing motion of the box ends on the anvils, pusher lugs projecting laterally outwardly from each plate operative on each forward stroke to rear-edge engage and advance a box end on the corresponding anvil from the chute to said nailing position, means mounting said lugs for yielding forward folding movement whereby to pass by and then engage behind the next-chute delivered anvil-supported box ends upon the movement of the plates to their rearmost position, means connecting the pusher plates for reciprocation as a unit, and power actuated means operative to reciprocate said pusher plate unit in predetermined timed relation to actuation of said nailing units.

8. A box end feeding mechanism for a box nailing machine having transversely spaced, anvils extending therethrough from the rear, and vertically reciprocable nailing units mounted above said anvils; such mechanism comprising chutes mounted in position to successively deliver box ends edgewise onto a rear portion of the anvils for feeding forward thereon to a predetermined nailing position, the anvils being rearwardly elongated to receive the box ends from the chutes, the latter extending upwardly and laterally outwardly from the anvils, transversely spaced, elongated rails extending horizontally and lengthwise of the machine above the anvils, pusher plates slidably suspended from the rails for horizontal reciprocating motion edgewise, pusher lugs on each plate projecting therefrom and operative on each forward stroke to engage and advance the box ends on the anvils from the chutes to said nailing position, a cross shaft connecting said pusher plates for reciprocation as a unit, a swingably mounted arm upstanding from below the cross shaft, a rod connecting said cross shaft and upper end of the swing arm, and power means operative to oscillate said arm in predetermined timed relation to actuation of said nailing units.

9. A box end feeding mechanism for a box nailing machine having transversely spaced anvils extending therethrough from the rear, and vertically reciprocable nailing units mounted above said anvils; such mechanism comprising means to deliver separate box ends edgewise onto said anvils at a rear point with said box ends facing laterally of the machine, power driven, reciprocable pusher means operative to recurringly advance the box ends on the anvils to a predetermined nailing position thereon below the nailing units, and timed automatic stop means arranged to prevent coasting of the box ends ahead of said nailing position; said stop means being responsive to forward motion of the pusher means adjacent the end of the advancing stroke of the latter.

10. A mechanism, as in claim 9, in which said stop means includes a laterally swingable arm inwardly of each box end when in nailing position, an element on each arm adapted to engage a box end and stop forward motion thereof upon laterally outward swinging of said arm, and cams on the pusher means disposed to engage and swing said arms laterally outwardly when the box ends are advanced to said nailing position.

11. A box end feeding mechanism for a box nailing machine having transversely spaced anvils extending therethrough from the rear, and vertically reciprocable nailing units mounted above said anvils; such mechanism comprising chutes mounted in position to successively deliver box ends edgewise onto a rear portion of the anvils for feeding forward thereon to a predetermined nailing position, transversely spaced rails extending horizontally and lengthwise of the machine above the anvils, a pusher plate slidably suspended from each rail for horizontal reciprocating motion edgewise, pusher means on each plate operative on each forward stroke to engage and advance a box end on the adjacent anvil from the chute to said nailing position, means connecting the pusher plates for reciprocations as a unit, power actuated means operative to reciprocate said pusher plate unit in predetermined timed relation to actuation of said nailing units, laterally swingable arms depending from the forward ends of the rails, said arms being laterally inwardly of the box ends when the latter are advanced to said nailing position by the pusher means, elements on said arms adapted to engage the box ends and stop forward motion thereof upon laterally outward swinging of said arms, and cams on the pusher plates disposed to engage and swing said arms laterally outward when the pusher plates are full advanced and the box ends are in said nailing positions.

12. In a nailing machine having a box framing assembly which includes transversely spaced anvils extending horizontally therethrough, vertically reciprocable nailing units above the anvils, a power driven shaft below the anvils, and driving connections between said shaft and the nailing units; a horizontally reciprocable box end pusher unit mounted in cooperation with the framing assembly operative to advance individual box ends edgewise on the anvils from a rear point to a nailing position below said nailing units, means to reciprocate the pusher unit from said shaft in predetermined timed relation to actuation of the nailing units thereby, means to recurringly deliver individual box ends to the anvils at said rear point, and means responsive to motion of the pusher means adjacent the end of its advancing stroke operative to engage the box ends and prevent coasting thereof ahead of said nailing positions.

13. In a box nailing machine, a box framing assembly including transversely spaced anvils, a reciprocable box end pusher unit mounted in cooperation with the framing assembly operative to advance individual box ends edgewise on the anvils from a rear point to an advanced point thereon for one of a series of nailing operations, elements arranged to engage the box ends and stop forward motion thereof at said advanced point and to subsequently release said box ends preparatory to manual repositioning of the box ends in the framing assembly, and means actuated upon the advance of the pusher unit to actuate said elements.

14. In a box nailing machine, a box framing assembly including transversely spaced anvils, a reciprocable box end pusher unit mounted in cooperation with the framing assembly operative to advance individual box ends edgewise on the anvils from a rear point to an advanced point thereon for one of a series of nailing operations, normally released brake means positioned on the machine to engage the box ends and prevent motion thereof forwardly beyond said advanced point, and means between the pusher unit and the brake means to apply the latter upon said box ends reaching said advanced point.

GERALD C. PAXTON.

References Cited in the file of this patent

UNITED STATES PATENTS

| Number | Name | Date |
|---|---|---|
| 344,419 | Swift | June 29, 1886 |
| 698,482 | Erickson | Apr. 29, 1902 |
| 1,448,412 | Lundholm | Mar. 13, 1923 |
| 2,113,360 | Tate | Apr. 5, 1938 |
| 2,488,757 | Benson | Nov. 22, 1949 |